(No Model.)
P. MARCUSON.
FINGER GUIDE FOR MUSICAL INSTRUMENTS.
No. 602,862. Patented Apr. 26, 1898.
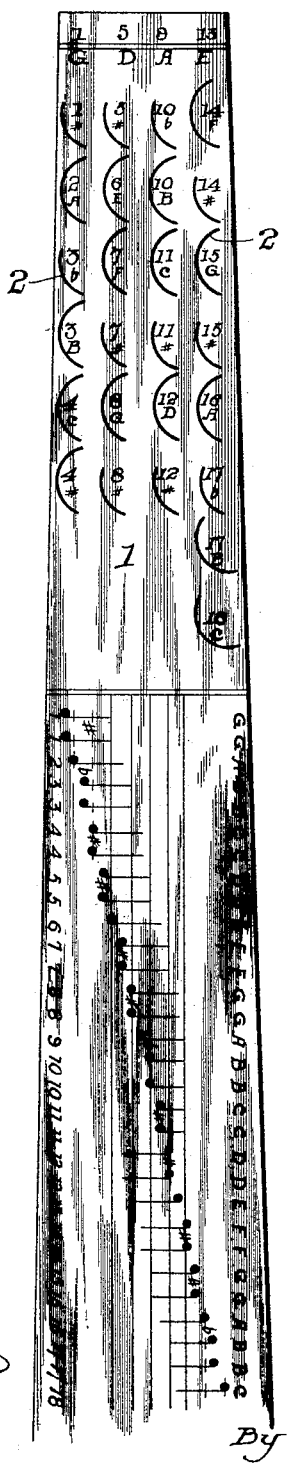

UNITED STATES PATENT OFFICE.

PHILIP MARCUSON, OF BALTIMORE, MARYLAND.

FINGER-GUIDE FOR MUSICAL INSTRUMENTS.

SPECIFICATION forming part of Letters Patent No. 602,862, dated April 26, 1898.

Application filed July 14, 1897. Serial No. 644,529. (No model.)

*To all whom it may concern:*

Be it known that I, PHILIP MARCUSON, a citizen of the United States of America, residing at Baltimore, in the State of Maryland, have invented certain new and useful Improvements in Finger-Guides for Musical Instruments, of which the following is a specification, reference being had therein to the accompanying drawing.

This invention relates to means for facilitating the reading of music and the production of a proper note on an instrument, the object being to form on a chart or keyboard characters indicating the proper position for the finger-pressure and the angle with relation to the key that the finger should protrude over the keyboard.

A further object of the invention is to arrange the music showing the notes and to arrange below the bars suitable numerals or characters corresponding to the proper position on the keyboard.

With the above and other objects in view the invention consists in the details of construction and in the arrangement and combination of parts to be hereinafter more fully set forth, and specifically embodied in the annexed claims.

In describing the invention in detail reference will be had to the accompanying drawing, forming part of this specification, wherein I have shown by a plan view a portion of a keyboard or chart with my invention applied thereto.

In the drawing, 1 denotes the keyboard or chart, having a number of curved lines 2 arranged thereon, said lines being so positioned that the contour of the end of the finger will register therewith when the finger is in position on the keyboard to produce the note embraced by the curved line, and with the note is a numeral indicating the note corresponding with the number on the music-sheet.

When the student wishes to sound a note, he has but to observe the number at the bottom of the staff and find the corresponding number on the keyboard. Thus if the note is "F" the finger is placed on a line at the top, as illustrated in the drawing, to the right of the board, and as the numeral and letter are inclosed by the indicating character the student will observe that the "14," as indicated in the music, represents the letter "F" on the keyboard and staff, which will result in expediting his acquaintance with the reading of music. It will also be observed that I distinguish the sharps and flats from the natural notes by having the intervening indicating characters of less length.

Another great advantage of my invention resides in the position or inclination of the curved indicating-lines, it being understood that when the hand is in proper position on the neck of the instrument the fingers will cross the keyboard at the top at nearly right angles to the length of the board, while to strike the proper position for a note lower down on the board the finger crosses the said board obliquely at varying angles. By the position of the curved lines the angle can be determined, for in order to have the hand in proper position and the finger at the proper angle the finger must be placed on the board in such position that the line lies around the finger uniformly, and from an inspection of the drawing the advantages will be understood.

The construction and application will be obvious from the foregoing description, it being noted that slight variations and changes in the proportions and details may be resorted to without changing the status of the invention.

Having fully described my invention, what I claim as new, and desire to secure by Letters Patent, is—

1. A finger-board having curved lines inscribed thereon at various angles, said lines inclosing a numeral or other indicating characters, as and for the purpose described.

2. A finger-board having curved lines thereon adapted to register with the contour of the finger when the finger is in proper position for producing a desired note.

3. A finger-board having a series of curved lines thereon adapted to register with the contour of the finger when the finger is in proper position and a second series of curved lines distinguishable from the first-named series, as and for the purpose described.

In testimony whereof I affix my signature in presence of two witnesses.

PHILIP MARCUSON.

Witnesses:
R. S. C. CALDWELL,
H. C. CALDWELL.